(12) United States Patent
Yeung et al.

(10) Patent No.: US 7,915,923 B1
(45) Date of Patent: Mar. 29, 2011

(54) SERIAL LINK DRIVER INTERFACE FOR A COMMUNICATION SYSTEM

(75) Inventors: Tony Yeung, Milpitas, CA (US); Michael Yimin Zhang, Palo Alto, CA (US)

(73) Assignee: Pericom Semiconductor, San Jose, CA (US)

( * ) Notice: Subject to any disclaimer, the term of this patent is extended or adjusted under 35 U.S.C. 154(b) by 60 days.

(21) Appl. No.: 12/400,708

(22) Filed: Mar. 9, 2009

(51) Int. Cl.
*H03K 19/0175* (2006.01)

(52) U.S. Cl. ............ 326/82; 326/86; 375/211; 375/229; 710/106

(58) Field of Classification Search ............... 326/82–83, 326/86; 375/211–215, 229–236; 710/100, 710/105–106
See application file for complete search history.

(56) References Cited

U.S. PATENT DOCUMENTS

| | | | | |
|---|---|---|---|---|
| 4,837,780 A | * | 6/1989 | Grover | 375/229 |
| 6,321,282 B1 | * | 11/2001 | Horowitz et al. | 710/104 |
| 6,904,110 B2 | | 6/2005 | Trans | |
| 7,401,985 B2 | * | 7/2008 | Aronson et al. | 385/89 |
| 2003/0174022 A1 | * | 9/2003 | Zamir et al. | 330/253 |
| 2004/0022311 A1 | * | 2/2004 | Zerbe et al. | 375/229 |
| 2005/0025229 A1 | * | 2/2005 | Jones et al. | 375/232 |
| 2005/0182876 A1 | * | 8/2005 | Kim et al. | 710/100 |
| 2008/0304557 A1 | * | 12/2008 | Hollis | 375/231 |
| 2009/0116639 A1 | * | 5/2009 | Zimmerman et al. | 379/417 |

* cited by examiner

*Primary Examiner* — James H. Cho
*Assistant Examiner* — Jason M Crawford
(74) *Attorney, Agent, or Firm* — The Webostad Firm

(57) ABSTRACT

Method and apparatus for a communication system (100) using a driver block (200) are described. The driver block includes memory having programmable non-volatile memory cells for storing configuration settings associated with operation of the driver block (200). The driver block (200) is programmable for a selected interface protocol for operation in an adaptive equalization mode to obtain an adaptive equalization value. The adaptive equalization value is stored as a fixed equalization value for operating the driver block in a fixed equalization mode. The driver block may be used as a serial link driver interface.

15 Claims, 4 Drawing Sheets

SERIAL LINK DRIVER INTERFACE FOR A COMMUNICATION SYSTEM

FIELD

Figure 1:
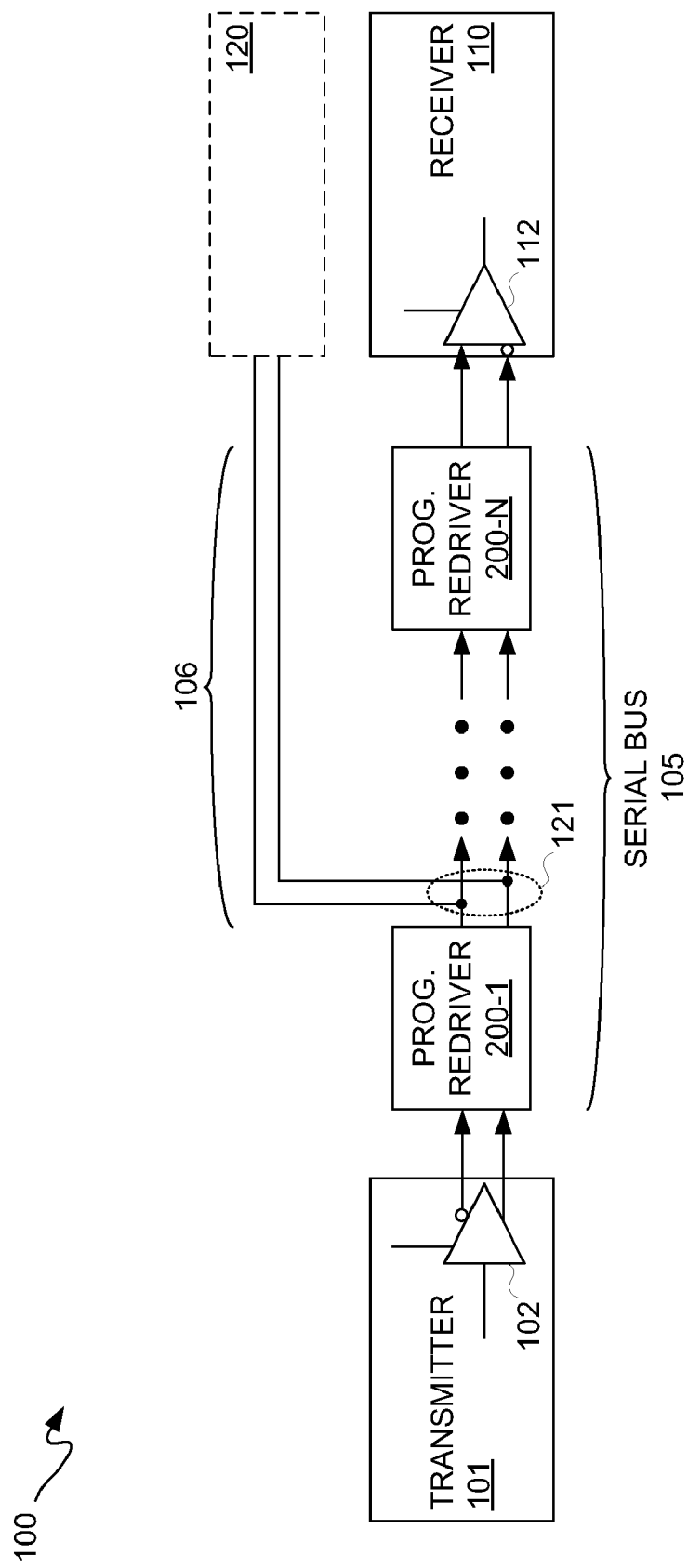

One or more aspects of the invention generally relate to integrated circuits ("IC"). More particularly, one or more aspects of the invention generally relate to a serial link driver interface for a communication system.

BACKGROUND

It should be appreciated that serial communication may conform to a serial interface protocol, such as Peripheral Component Interconnect ("PCI"), PCI Express ("PCIe"), Serial Advanced Technology Attachment ("SATA"), and fiber channel among other serial interface protocols. Conventionally, a serial bus has signals that propagate across it in conformance with serial interface protocol. Such serial bus may be formed using signal lines, and the signals may be attenuated or otherwise distorted when propagated across a serial bus, such as from a transmitter to a receiver.

Distortion of a signal propagating across a serial bus may negatively impact the ability to conform to a serial interface protocol. A conventional compensation for distortion may be provided by adaptive equalization. Generally, adaptive equalization involves obtaining a serial bus signal and filtering such signal before providing an adaptively equalized signal for output. A transmitter may employ a digital signal which is filtered using analog filters, and the analog output of such filters is subsequently converted back to a digital signal for providing such adaptively equalized output to a receiver.

A limitation of adaptive equalization is that once such adaptive equalization has obtained a relatively steady state status, output of such analog filters continues, which adds delay in propagation of such signals. Additionally, due to differences between serial interface protocols, such as in ranges of frequency of operation, adaptive equalizers may not be able to handle a wide range of different serial interface protocols. In the past, this has meant having to stock a variety of different transmitters with different adaptive equalizers for various applications.

BRIEF SUMMARY

One or more aspects generally relate to integrated circuits ("IC") and, more particularly, to a serial link driver interface for a communication system.

An embodiment of an apparatus for a communication system having a transmitter and a receiver is described. A driver block is capable of being coupled between the transmitter and the receiver to receive a transmission from the transmitter for processing by the driver block for providing the transmission after processing to the receiver. The driver block includes a memory having programmable non-volatile memory cells for storing configuration settings associated with operation of the driver block.

An embodiment of a method for communicating from a transmission block to a reception block is described. For the method, a driver block is programmed for a selected interface protocol. The driver block is operated in an adaptive equalization mode to obtain an adaptive equalization value. The adaptive equalization value is stored as a fixed equalization value. The driver block is operated in a fixed equalization mode using the fixed equalization value.

An embodiment of a serial link driver interface is described. The serial link driver interface includes an equalizer, an adaptive equalization circuit, select circuitry, and a memory and control logic block. The equalizer is coupled to receive a first control signal for setting output of the equalizer. The first control signal is provided from the adaptive equalization circuit via the select circuitry in a first mode of operation. In the first mode of operation, the first control signal is time variant for adaptive equalization by the equalizer. The memory and control logic block are coupled to receive parametric input for a selected serial interface protocol. The memory and control logic block are configured to store the parametric input in non-volatile storage. The memory and control logic block are further coupled to receive the first control signal to store a time variant value thereof as a fixed value in the non-volatile storage. The first control signal is provided from the memory and control logic block via the select circuitry in a second mode of operation. The second mode of operation uses the fixed value for the first control signal for fixed equalization by the equalizer.

BRIEF DESCRIPTION OF THE DRAWING(S)

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 1 is a block diagram depicting an exemplary embodiment of a serial bus communication system.

Figure 2A:
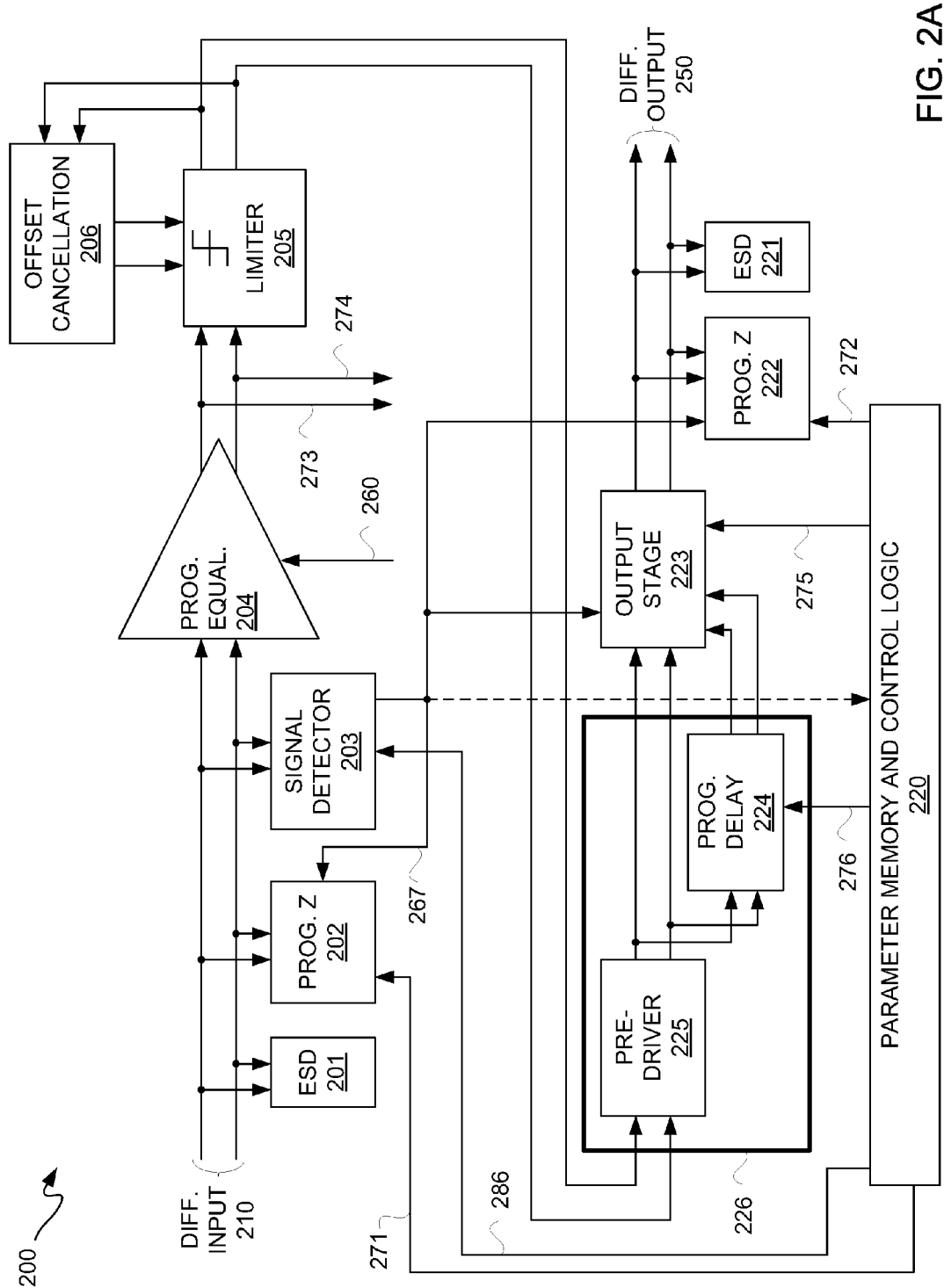
Figure 2B:
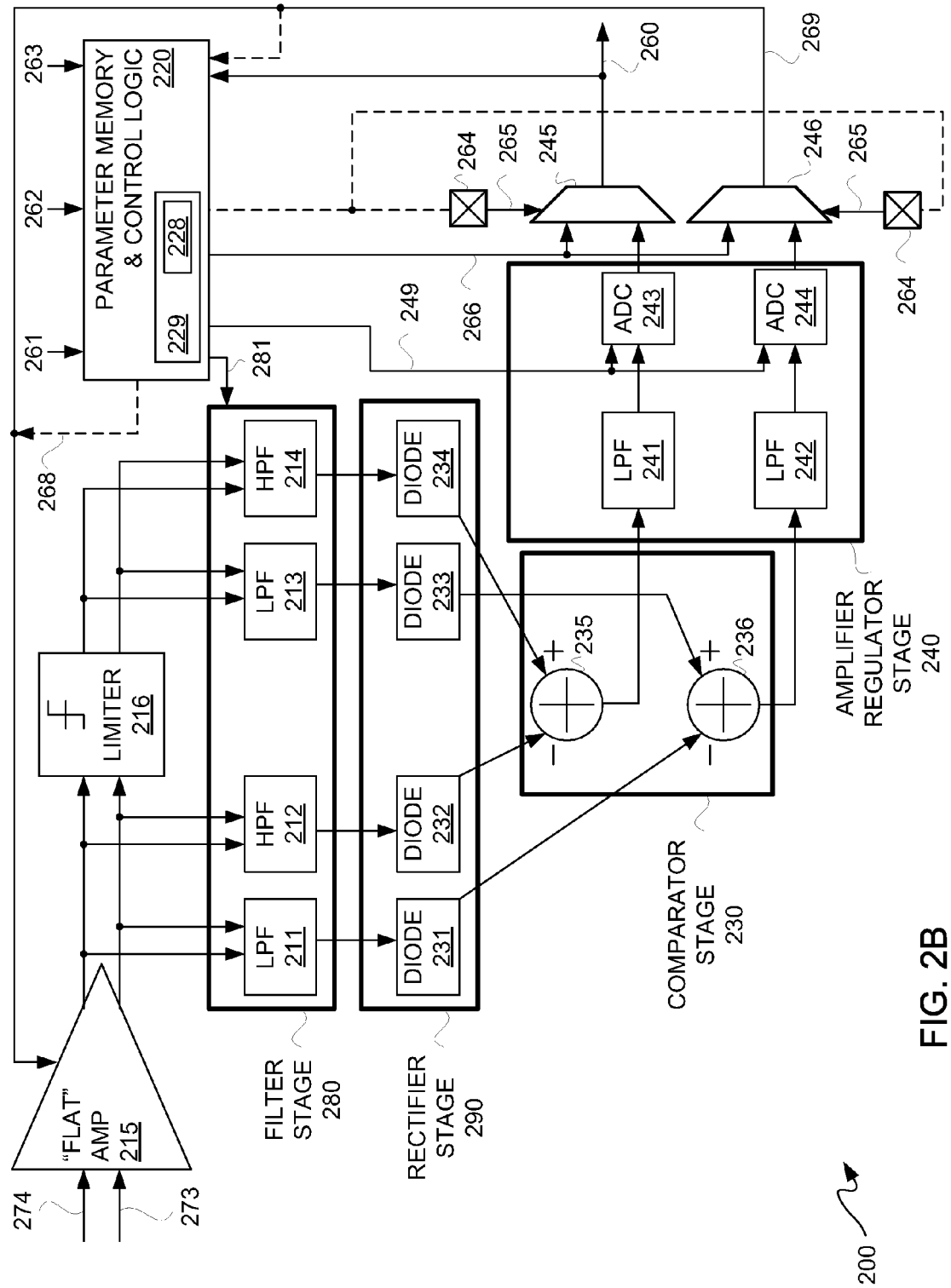

FIGS. 2A and 2B in combination are a block/schematic diagram depicting an exemplary embodiment of a programmable redriver.

Figure 3:
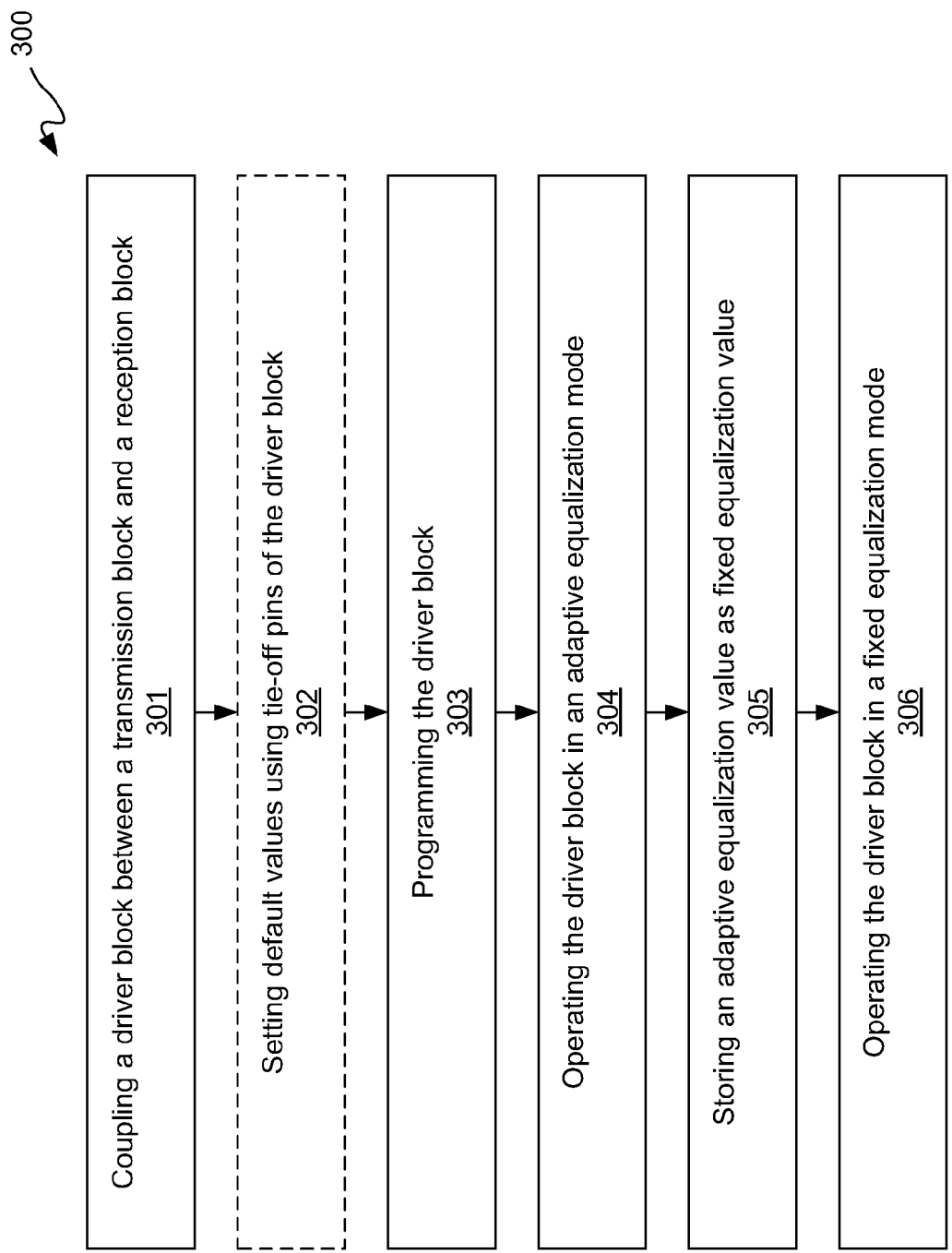

FIG. 3 is a flow diagram depicting an exemplary embodiment of an operational flow for an implementation of programmable redriver of FIGS. 2A and 2B.

DETAILED DESCRIPTION

In the following description, numerous specific details are set forth to provide a more thorough description of the specific embodiments. It should be apparent, however, to one skilled in the art, that the invention may be practiced without all the specific details given below. In other instances, well-known features have not been described in detail so as not to obscure the embodiments. For ease of illustration, the same number labels are used in different diagrams to refer to the same items; however, in alternative embodiments the items may be different. Furthermore, though particular numerical examples are described herein for purposes of clarity by way of example, it should be understood that the scope of the description is not limited to these particular numerical examples as other values may be used.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Referring to FIG. 1, there is shown a block diagram depicting an exemplary embodiment of a serial bus communication system 100. Serial bus communication system 100 includes transmitter 101, receiver 110, and serial bus 105. As used herein, the terms "include" and "including" shall mean to include without limitation. Serial bus 105 includes one or more programmable drivers or "redrivers" 200-1 through 200-N, for N a positive integer greater than one, coupled in series. It should be appreciated that a single programmable redriver may be used in serial bus 105, depending on trace length of such serial bus. Thus, it should be understood that a driver 200 may be used as a serial link driver interface for serial bus 105, or multiple drivers 200 may be coupled to to provide a serial link driver interface for serial bus 105. Additionally, it should be appreciated that serial bus 105 includes traces formed of a conductive material or other means for propagating electric signals.

It should be understood that transmitter 101 may be implemented in a larger block, such as any of a variety of integrated circuits or devices, including but not limited to input/output ("I/O") hubs, root complexes, servers, and laptop docking stations, among others. Furthermore, it should be appreciated that receiver 110 may be embedded in a larger block, such as any of a variety of peripheral devices, including but not limited to hard disk drives, graphics cards, and daughter cards, among others.

Transmitter 101 in this example includes a differential output driver 102 for providing a differential signal to programmable redriver 200-1. Programmable redriver 200-1, which is described in additional detail as programmable redriver 200 of FIGS. 2A and 2B, processes an output transmission from transmitter 101 to provide such processed output transmission to another programmable redriver or more directly to receiver 110. Receiver 110 includes a differential input driver 112.

There are many known differential digital signaling protocols, such as differential Stub-Series Terminated Logic ("SSTL"), differential High-Speed Transceiver Logic ("HSTL"), Low-Voltage Differential Signaling ("LVDS"), differential Low-Voltage Positive Emitter Coupled Logic ("LVPECL"), and Reduced Swing Differential Signaling ("RSDS") among other differential digital signaling protocols. Additionally, single-ended serial interface protocols may be used, such as Low Voltage Transistor-Transistor Logic ("LVTTL") such as used for PCI, and Low Voltage Complementary Metal Oxide Semiconductor ("LVCMOS"), among other single-ended serial interface protocols. It should be understood that conventionally PCI uses an LVTTL input buffer and a push-pull output buffer. Communication via serial bus 105 may use a differential or single-ended signaling protocol.

FIGS. 2A and 2B in combination are a block/schematic diagram depicting an exemplary embodiment of a programmable redriver 200. With simultaneous reference to FIGS. 2A and 2B, programmable redriver 200 is further described.

Programmable redriver 200 may be any of programmable redrivers 200-1 through 200-N of FIG. 1. Programmable redriver 200 includes parameter memory and control logic 220. Even though parameter memory and control logic 220 is shown as two separate blocks in FIGS. 2A and 2B, it should be considered a single block. Furthermore, it should be understood that programmable redriver 200 of FIGS. 2A and 2B may be implemented as a single integrated circuit chip.

In an embodiment of such programmable redriver 200, default values for decibel level, swing voltage, or pre-emphasis/de-emphasis may be supplied by use of tie-off pins 261, 262, and 263, respectively. In an embodiment there are three of tie-off pins 261, two of tie-off pins 262, and two of tie-off pins 263. It should however be understood that even though single arrows for input pins are illustratively shown for purposes of clarity, multiple sets of tie-off pins, each of which may have one or more pins, may be used for setting default values. Furthermore, even though single lines for signal paths are illustratively shown for purposes of clarity, it should be understood that in instances a single trace or multiple traces in parallel may be implemented.

Pads 264 may be coupled to a switch (not shown) for switching between fixed voltage levels. Pads 264 are used to provide control select signal 265 to multiplexers 245 and 246. Pads 264 may optionally be coupled to circuitry of parameter memory and control logic 220 that is flipped from an initial state to a subsequent state. Such initial state may be used for an initial operation of programmable redriver 200, and such subsequent state may be used after an initial use of programmable redriver 200. As described below in additional detail, the initial state is generally referring to an adaptive equalization mode of operation, and the subsequent state is generally referring to a fixed equalization mode of operation. Alternatively, the initial mode of operation, namely the adaptive equalization mode, may be omitted by optionally programming parameter memory and control logic 220 or coupling pads 264 to a fixed voltage level (not shown) to use a fixed equalization mode and bypass adaptive equalization.

Output of multiplexer 245, namely equalization signal 260, is fed into parameter memory and control logic 220 for receiving an adaptive equalization value. Such adaptive equalization value may stored in parameter memory and control logic 220, whether in a memory cell or a register thereof. A reasonably steady state value for such adaptive equalization value as determined by control logic of parameter memory and control logic 220 may be stored therein.

Control logic of parameter memory and control logic 220 may optionally be configured to set a flag that such an adaptive equalization value is stored therein, and such flag may cause control select signal 265 to change state. In the initial mode of adaptive equalization, outputs from analog-to-digital converters ("ADCs") 243 and 244 are respectively output from multiplexers 245 and 246 due to state of control select signal 265. However, in the subsequent fixed equalization mode, the steady state adaptive equalization value ("fixed equalization value") 266 stored in parameter memory and control logic 220 is provided as input to multiplexers 245 and 246, and state of control select signal 265 in response to such flag being set changes state such that such fixed equalization value 266 is output from multiplexers 245 and 246. Even though the example of multiplexers 245 and 246 is used, it should be appreciated that other circuitry may be used to provide select circuitry along the lines previously described.

For purposes of clarity by way of example and not limitation, it shall be assumed that programmable redriver 200 initially operates in an adaptive equalization mode in order to obtain a steady state adaptive equalization value, as previously described. After such steady state adaptive equalization value is obtained, it shall be assumed that programmable redriver 200 dynamically switches or upon restart of redriver 200 switches from the adaptive equalization mode to a fixed equalization mode. In other words, it should be understood that such switch may occur while programmable redriver 200 is in an operating mode, such as when signal detector 203 indicates no signal is present, as indicated by signal status signal 267 which may optionally be provided to parameter memory and control logic 220. Thus, for example, during a standby interval, a mode change from adaptive to fixed equalization may optionally be made by parameter memory and control logic 220 responsive to signal status signal 267. Alternatively, after initial operation of programmable redriver 200, such as after an insertion of a reset system in which programmable redriver 200 is implemented, a fixed equalization value stored in parameter memory and control logic 220 may be used for subsequent operation of programmable redriver 200.

On an input side of programmable redriver 200, there is a differential input 210 which is provided to a programmable equalizer 204. For purposes of clarity by way of example and not limitation, a differential input 210 is assumed, even though a single-ended input may be used. Differential input 210 is for high speed serial communication of digital information. On an output side of programmable redriver 200, there is a differential output 250. Again, it should be appreciated that a single-ended output may be used, but, for purposes of clarity by way of example and not limitation, it shall be assumed that differential input and differential output are implemented.

Coupled to receive differential input 210 are an electrostatic discharge ("ESD") protection block 201, programmable termination impedance ("Z") block 202, signal detector 203, and programmable equalizer 204. Signal detector 203 is configured to detect the presence or absence of input on different input 210, namely the presence or absence of a transmission, for example, from transmitter 101 of FIG. 1. Parameter memory and control logic 220 may be programmed with a threshold voltage setting for providing to signal detector 203 via threshold set signal 286 for determining presence or absence of a signal on differential input 210. Coupled to provide differential output 250 from output state 223 are ESD protection block 221 and programmable output impedance block 222.

Programmable impedance blocks 202 and 222 are coupled to parameter memory and control logic 220. It should be understood that input and output termination impedances may vary from serial interface protocol to serial interface protocol. Furthermore, it should be appreciated that in an active mode, such input and output impedances, which conventionally are of the same value but may be different, have a lower resistance than when in a non-active mode. Accordingly, it should be understood that if signal detector 203 detects presence of a signal on differential input 210, then programmable redriver 200 is in an active mode of operation. In an active mode of operation, input termination impedance for differential input 210 and output termination impedance for differential output 250 are respectively set by programmable impedance block 202 and programmable impedance block 222, where the value of such settings is predetermined by programming parameter memory and control logic 220 as provided to those blocks respectively by impedance signals 271 and 272. In a standby or other non-active mode of operation of programmable redriver 200, signal detector 203, not detecting the present of input on differential input 210, via signal status signal 267 causes programmable impedance blocks 202 and 222 to change their respective termination impedances. Again, these termination impedances for the non-active mode are predetermined and programmed into parameter memory and control logic 220 and provided via signals 271 and 272, respectively, to those blocks. Accordingly, it should be appreciated that input termination impedances and output termination impedances may be programmably set for any of a variety of serial interface protocols.

Assuming there is a transmission on differential input 210, programmable equalizer 204 receiving such transmission may be programmed to adjust the gain of such transmission, as well as configured to remove some amount of noise from such transmission. Generally, programmable equalizer 204 may be configured for noise and frequency shaping as well as amplitude adjustment for re-buffering and cleaning up a transmission. Equalization signal 260 is provided to programmable equalizer 204 for such processing of a transmission, where equalization signal 260 is sourced in this embodiment from the output of multiplexer 245.

Output of programmable equalizer 204 is provided as adjusted signals 273 and 274 to limiter 205 and to amplifier 215 as respective inputs to each of those circuits. Output of limiter 205 is provided to offset cancellation block 206 and to pre-driver 225 as respective inputs to those blocks.

Offset cancellation block 206 provides a feedback output to limiter 205 to reduce any offset due to process variation, such as mismatch in devices. In other words, such feedback is to help ensure that the output voltage level of limiter 205 is correct.

Output of pre-driver 225 is provided to output stage 223. Output stage 223 is programmable to set the swing output voltage for output as differential output 250. Swing output voltage, as is known, may vary from serial interface protocol to serial interface protocol, and may be set in parameter memory and control logic 220. Such setting of output voltage swing may be provided via swing signal 275 from parameter memory and control logic 220 to output stage 223 for programming of output stage 223 to a selected output swing voltage for a serial interface protocol.

The output of limiter 205 is split into two pathways by the output of pre-driver 225, namely the main output path directly provided to output stage 223, and the delayed output path provided to programmable delay 224 and then to output stage 223. Output stage 223 combines the two pairs of differential signals, namely one from pre-driver 225 and the other from programmable delay 224, back into a single differential output 250 with programmed output impedance from programmable impedance block 222.

As previously described, tie-off pins 261 through 263 may be used to set default values for decibel level, voltage swing, or pre-emphasis/de-emphasis settings. Alternatively, any, all, or some of decibel level, voltage swing, or pre-emphasis/de-emphasis may be programmed into parameter memory and control logic 220. Along those lines, pre-emphasis or de-emphasis signal 276 may be provided to programmable delay 224 for setting delay thereof. Output of pre-driver 225 in addition to being provided to output stage 223 is provided to programmable delay 224, and output of programmable delay 224 is provided to output stage 223 for adjustment of such delay in output stage 223 for differential output 250. It should be appreciated that pre-driver 225 and programmable delay 224 may be implemented as a single pre-driver block 226.

For an equalization signal path described below in additional detail, the output of programmable equalizer 204 is generally split into two pathways. One of the pathways is to limiter 205 for an output path, and the other of the pathways is to amplifier 215 for an adaptive equalization loop.

Accordingly, differential signals from the output of programmable equalizer 204 are provided as input to amplifier 215. Amplifier 215 may be what is known as a "flat" amplifier. By "flat" amplifier, it is meant that amplifier 215 is used to adjust gain up or down but is generally not used for noise-frequency shaping, as is for example programmable equalizer 204. Output of amplifier 215 is provided to limiter 216 and to filter stage 280. Output of amplifier 215 is provided to limiter 216 in order to effectively speed up rise and fall times of edges and provide a limited output swing.

Output of limiter 216 is provided to filter stage 280. Inputs and outputs of limiter 216 are filtered by two paths within filter stage 280, or more generally within an equalization loop. The low frequency loop path filters low frequency spectrum of the differential output of amplifier 215 before rectifying and comparing, and the high frequency loop path filters the high frequency spectrum of the differential output of amplifier 215.

Amplifier 215, limiter 216, filter stage 280, rectifier stage 290, comparator stage 230, and amplifier regulator stage 240, as well as gain control feedback 269 via select circuitry, namely multiplexer 246 in an adaptive equalization mode, provide an adaptive equalization loop or path. Such adaptive equalization loop is used to obtain a steady state adaptive equalization value, as previously described.

Returning to filter stage 280, a frequency range for operation thereof may be programmed into parameter memory and control logic 220. Such a frequency range may be provided to filter stage 280 via frequency range signal 281 for setting filters of filter stage 280. In this embodiment, filter stage 280 is shown as having low pass filters ("LPFs") 211 and 213 and high pass filters ("HPFs") 212 and 214. Low pass filter 211 and high pass filter 212 receive output from flat amplifier 215, and low pass filter 213 and high pass filter 214 receive output from limiter 216. Output of filter stage 280 is provided to rectifier stage 290.

Rectifier stage 290 in this embodiment includes diodes 231 through 234. Diodes 231 through 234 are in this embodiment respectively coupled to receive outputs from filters 211 through 214. Output from rectifier stage 290 is provided to comparator stage 230. In this embodiment, output from diode 232 is provided to a minus port of a summer 235 of comparator stage 230, and output of diode 234 is provided to a plus port of summer 235. Furthermore, output of diode 231 is provided to a minus port of summer 236 of comparator stage 230, and output of diode 233 is provided to a plus port of summer 236.

Because one low frequency path is before limiter 216 and other low frequency path is after limiter 216, and because one high frequency path is before limiter 216 and another high frequency path is after limiter 216, the comparison performed by comparator stage 230 is the low frequency path before the limiter to the low frequency path after the limiter for the output of summer 236. Furthermore, the high frequency path before limiter 216 is compared with the high frequency path after limiter 216 by summer 235. Furthermore, this is a comparison because paths before limiter 216 are provided to minus ports of summers 235 and 236 and the paths after limiter 216 are provided to plus ports of summers 235 and 236.

Output of comparator stage 230 is provided to amplifier regulator stage 240. In this embodiment, output of summer 235 is provided to low pass filter 241 of amplifier regulator stage 240, and output of summer 236 is provided to low pass filter 242 of amplifier regulator stage 240. Output of low pass filter 241 is provided to analog-to-digital converter ("ADC") 243 of amplifier regulator stage 240, and output of low pass filter 242 is provided to ADC 244 of amplifier regulator stage 240.

It should be understood that the output of filters 241 and 242 are analog signals, and the output of ADCs 243 and 243 are digital signals. Parameter memory and control logic 220 may be programmed with a decibel level or a default decibel level may be used for providing a level signal 249 as a control input to ADCs 243 and 244. Level signal 249 is a digital signal. Outputs of comparator stage 230 may vary over time, and thus outputs of filters 241 and 242 are variable analog signals.

Filter stage 280 extracts the power spectrum of the amplitude of amplifier 215 for comparing the magnitude by comparator stage 230. This allows the adjustment of such output from comparator stage 230 of the gain as indicated by level signal 249. In other words, a target decibel level may be adaptively equalized by adjusting gain of amplifier 215 as well as that of programmable equalizer 204. The digital gain control signals, namely signals 260 and 269 respectively provided to programmable equalizer 204 and flat amplifier 215, thus allow an adjusted equalized gain such that the spectrum of programmable equalizer 204 is adaptive. This allow for adaptation to any of a variety of serial link interface protocols for different frequency ranges as set in filter stage 280.

As previously described, even though the outputs of filters 241 and 242 are variable, a generally steady state value may be obtained with respect to the output of ADCs 243 and 244 via multiplexers 245 and 246. The steady state value with respect to programmable equalizer 204, namely control signal 260 output from multiplexer 245, may be stored in parameter memory and control logic 220 for a fixed equalization mode as previously described.

In a fixed equalization mode, the adaptive equalization path previously described is not used. By not having to use the adaptive equalization path, signal propagation delay through programmable redriver 200 in a fixed equalization mode may be less than in an adaptive equalization mode. Furthermore, in a fixed equalization mode of operation by programmable redriver 200, less power may be consumed as the adaptive equalization path is inactive. In some applications where there might be more variability, the adaptive equalization path may continue to be used; however, in some applications, once the steady state adaptive equalization value is obtained, a fixed equalization mode is sufficient.

Parameter memory and control logic 220 may include one or more arrays of non-volatile memory cells 229. Additionally, it should be appreciated that read/write/address circuitry (not shown) conventionally associated with a non-volatile memory may be part of parameter memory and control logic 220, as well as associated interfacing (not shown). In an embodiment, non-volatile memory cells 229 are read only memory ("ROM") cells and the associated interface and logic (not shown) of such ROM cells is for an EEPROM. However, it should be appreciated that other known non-volatile memory cells, and associated circuitry, may be used.

Alternatively, a table 228 may be stored in memory cells 229 of parameter memory and control logic 220. Table 228 may be a table of gain settings for amplifier 215, and thus alternatively a gain setting for amplifier 215 may be obtained from an entry in such table as generally indicated by gain setting signal 268, where a table entry is selected responsive to control signal 269 alternatively provided to parameter memory and control logic 220.

FIG. 3 is a flow diagram depicting an exemplary embodiment of an operational flow 300 for an implementation of programmable redriver 200 of FIGS. 2A and 2B. With simultaneous reference to all the figures hereof, operational flow 300 is further described.

At 301, a driver block, such as programmable redriver 200, is coupled between a transmission block and a reception block as part of a serial communication path. Such transmission block may be transmitter 101 and such reception block may be receiver 110.

Optionally, at 302, default values of the driver block may be set using tie-off pins as part of this coupling. Conventionally, the coupling may be on a same PCB, where a serial bus, such as serial bus 105, is used. In this example, it is assumed that programmable redriver 200 is implemented as a stand-alone IC chip.

At 303, the driver block, such as in this example programmable redriver 200, may be programmed. In other words, parametric input may be provided to parameter memory and control logic 220 for conforming to an application calling for a serial interface protocol. This programming may be as previously described, and may include one or more values that optionally may be input using tie-off pins.

At 304, the driver block may be operated in an adaptive equalization mode. Again, programmable redriver 200 may be operated to obtain a steady state adaptive equalization value. Accordingly, once a time-variant value is at a steady state value sufficient for an application, a fixed equalization value may be stored based on what was previously viewed as a time-variant value.

At 305, such adaptive equalization value obtained may be stored as a fixed equalization value for subsequent operation of the driver block, namely programmable redriver 200. At 306, the driver block may be operated in a fixed equalization mode. In other words, programmable redriver 200, without a user having to program it to have a fixed equalization value, may effectively automatically store such adaptive equalization value for subsequent operation.

In addition to the advantages of potentially not having as long a propagation delay or having lower power consumption, a fixed equalization mode where the fixed equalization value is obtained from an adaptive equalization mode allows programmable redriver 200 to automatically adapt to its surroundings. In other words, if the actual adaptive equalization value is not known, or varies from what was thought, which may be due to differences in devices, programmable redriver 200 is adaptable to its environment.

Accordingly, it should be appreciated that a programmable/re-programmable redriver for various applications and interfaces has been described. Such programmable redriver may be used in short trace, long trace, field programmable, or inventory control applications. Such programmable redriver may be implemented as a monolithic IC chip, where non-volatile memory cells are included as part of the programmable redriver along with interfacing and associated circuitry for programming thereof. Furthermore, it should be appreciated that different serial link protocol specifications for different serial link protocols may be programmed into such a programmable redriver, including without limitation pre-emphasis/de-emphasis for output, decibel level for equalization, output swing voltage for output, and termination impedance for input/output. Thus, adaptive equalization capability, as well as ability to adapt to a particular application or environment, is provided.

Accordingly, it should further be appreciated that a serial-data redriver that combines a linear equalizer, limiter, output de-emphasis/pre-emphasis circuitry, signal detector, adaptive equalization loop, and on-chip non-volatile memory in a monolithic redriver IC chip allows for electrical configuration of various information including equalizer settings, input thresholds, output voltage swing, output de-emphasis/pre-emphasis settings, input and output impedance settings, and adaptive equalization loop parameters, any, some, or all of which may be configured after such redriver is fabricated. Furthermore, parameters associated with an interface protocol may be programmed during a wafer sort or after packaging of such IC chips. Such a redriver may be erased prior to packaging, such that programming functionality may be verified prior to shipment.

Additionally, it should be appreciated that by using reprogrammable non-volatile memory, a programmable redriver as described herein may be implemented without having to program fuses. The ability to avoid having to program fuses allows a programmable redriver to be easily reset. Because such a programmable redriver may be programmed, cycle time from customer request to prototype or delivered product may be reduced. Moreover, users may field program such programmable redriver. While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. An apparatus for a communication system having a transmitter and a receiver, comprising:
   a driver block for coupling between the transmitter and the receiver to receive a transmission from the transmitter for processing by the driver block for providing the transmission after processing to the receiver;
   the driver block including a memory;
   the memory including programmable non-volatile memory cells for storing configuration settings associated with operation of the driver block;
   wherein the memory is coupled with control logic for providing a memory and control logic block;
   wherein the driver block further includes programmable input termination impedance, programmable output termination impedance, and a programmable signal detector, each of which are coupled to the memory and control logic block;
   wherein the programmable signal detector is coupled to receive the transmission from the transmitter and coupled to receive a threshold value from the memory and control logic block;
   wherein the threshold value is for determining whether the transmission to the driver block is present;
   wherein the programmable input termination impedance is coupled to the programmable signal detector to receive a switch signal for switching between a first input impedance for an active mode when the transmission is present and a second input impedance for a non-active mode when the transmission is not present;
   wherein the programmable input termination impedance is coupled to the memory and control logic block to set the first input impedance and the second input impedance;
   wherein the programmable output termination impedance is coupled to the programmable signal detector to receive the switch signal for switching between a first output impedance for the active mode when the transmission is present and a second output impedance for the non-active mode when the transmission is not present; and
   wherein the programmable output termination impedance is coupled to the memory and control logic block to set the first output impedance and the second output impedance.

2. An apparatus for a communication system having a transmitter and a receiver, comprising:
   a driver block for coupling between the transmitter and the receiver to receive a transmission from the transmitter for processing by the driver block for providing the transmission after processing to the receiver;
   the driver block including a memory;
   the memory including programmable non-volatile memory cells for storing configuration settings associated with operation of the driver block;
   wherein the memory is coupled with control logic to provide a memory and control logic block;
   wherein the driver block further includes an equalizer, an adaptive equalization circuit, and select circuitry;
   wherein the equalizer is coupled to receive a first control signal for setting output of the equalizer;
   wherein the first control signal is provided from the adaptive equalization circuit via the select circuitry in a first mode of operation;

wherein in the first mode of operation, the first control signal is time variant for adaptive equalization by the equalizer;

wherein the memory and control logic block are coupled to receive parametric input for storage as the configuration settings and coupled to receive the first control signal to store a time variant value thereof as a fixed value;

wherein the first control signal is provided from the memory and control logic block via the select circuitry in a second mode of operation; and wherein the second mode of operation uses the fixed value for the first control signal for fixed equalization by the equalizer.

3. The apparatus, according to claim 2, wherein:

the adaptive equalization circuit includes an amplifier, a first limiter, a filter block, a rectifier, a comparator block, and an amplitude regulator;

the adaptive equalization circuit is configured to provide a bifurcated power spectrum of the output from the equalizer for comparing magnitudes of the bifurcated power spectrum;

the amplitude regulator is coupled to the memory and control logic block for receiving a set signal to analog-to-digital converters thereof and coupled to the comparator block for receiving compared results of the amplitude magnitudes comparisons;

a first of the compared results is provided to a first portion of the select circuitry for output therefrom as the first control signal in the first mode of operation;

a second of the compared results is provided to a second portion of the select circuitry for output therefrom as a second control signal in the first mode of operation; and the second control signal is provided to the amplifier for gain control.

4. The apparatus, according to claim 3, wherein:

the driver block further includes a second limiter, a pre-driver, a programmable path delay, and a programmable output stage;

the second limiter is coupled to receive the output of the equalizer and coupled to provide output from the second limiter to the pre-driver;

the pre-driver is coupled to the programmable path delay and the programmable output stage for providing output respectively thereto;

the programmable path delay is coupled to the memory and control logic block to receive a pre-emphasis or de-emphasis signal for setting a delay; and the programmable output stage is coupled to the memory and control logic block to receive a swing signal therefrom for setting an output swing voltage.

5. The apparatus according to claim 4, wherein:

the driver block is implemented as a single integrated circuit chip; and the programmable non-volatile memory cells of the memory and control logic block are EEPROM memory cells.

6. A serial link driver interface, comprising:

an equalizer, an adaptive equalization circuit, select circuitry, and a memory and control logic block;

the equalizer coupled to receive a first control signal for setting output of the equalizer;

the first control signal being provided from the adaptive equalization circuit via the select circuitry in a first mode of operation;

in the first mode of operation, the first control signal being time variant for adaptive equalization by the equalizer;

the memory and control logic block coupled to receive parametric input for a selected serial interface protocol;

the memory and control logic block configured to store the parametric input in non-volatile storage;

the memory and control logic block further coupled to receive the first control signal to store a time variant value thereof as a fixed value in the non-volatile storage;

the first control signal being provided from the memory and control logic block via the select circuitry in a second mode of operation; and the second mode of operation using the fixed value for the first control signal for fixed equalization by the equalizer.

7. The serial link driver interface, according to claim 6, wherein the serial interface protocol is selected from a group consisting of PCI, PCIe, SAUI, SATA, and fiber channel.

8. The serial link driver interface, according to claim 7, wherein:

the adaptive equalization circuit includes an amplifier, a first limiter, a filter stage, a rectifier stage, a comparator stage, and an amplitude regulator stage;

the adaptive equalization circuit configured to provide a bifurcated power spectrum of the output from the equalizer for comparing magnitudes of the bifurcated power spectrum;

the amplitude regulator stage coupled to the memory and control logic block for receiving a set signal to analog-to-digital converters thereof and coupled to the comparator stage for receiving compared results of the amplitude magnitudes comparisons;

a first of the compared results being provided to a first portion of the select circuitry for output therefrom as the first control signal in the first mode of operation;

a second of the compared results being provide to a second portion of the select circuitry for output therefrom as a second control signal in the first mode of operation; and the second control signal being provided to the amplifier for gain control.

9. The serial link driver interface, according to claim 8, further comprising programmable input termination impedance, programmable output termination impedance, and a programmable signal detector each of which are coupled to the memory and control logic block for setting according to the serial interface protocol selected.

10. The serial link driver interface, according to claim 9, wherein:

the programmable signal detector is coupled to receive the transmission and coupled to receive a threshold value from the memory and control logic block;

the threshold value for determining whether the transmission is present;

the programmable input termination impedance is coupled to the signal detector to receive a switch signal for switching between a first input impedance for an active mode when the transmission is present and a second input impedance for a non-active mode when the transmission is not present;

the programmable input termination impedance is coupled to the memory and control logic block to set the first input impedance and the second input impedance;

the programmable output termination impedance is coupled to the signal detector to receive the switch signal for switching between a first output impedance for the active mode when the transmission is present and a second output impedance for the non-active mode when the transmission is not present; and the programmable output termination impedance is coupled to the memory and control logic block to set the first output impedance and the second output impedance.

11. The serial link driver interface, according to claim 10, further comprising a second limiter, a pre-driver, a programmable path delay, and a programmable output stage.

12. The serial link driver interface, according to claim 11, wherein:
- the second limiter is coupled to receive the output of the equalizer and coupled to the pre-driver to provide output of the second limiter thereto;
- the pre-driver is coupled to the programmable path delay and the programmable output stage to provide output thereto;
- the programmable path delay is coupled to the memory and control logic block for receiving a pre-emphasis or de-emphasis signal for setting a delay according to the serial interface protocol selected; and
- the programmable output stage coupled to the memory and control logic block for receiving a swing signal for setting an output swing voltage according to the serial interface protocol selected.

13. The serial link driver interface, according to claim 11, wherein the memory and control logic block has a plurality of tie-offs for setting defaults for a decibel level, an output voltage swing, and an emphasis selected from a group consisting of pre-emphasis and de-emphasis.

14. The serial link driver interface, according to claim 6, wherein the serial link driver interface is implemented as a single integrated circuit chip.

15. The serial link driver interface, according to claim 14, wherein the non-volatile storage includes EEPROM cells.

* * * * *